United States Patent [19]
Mashino

[11] Patent Number: 5,020,491
[45] Date of Patent: Jun. 4, 1991

[54] METHOD AND APPARATUS FOR CONTROLLING POWER GENERATION IN INTERNAL COMBUSTION ENGINES

[75] Inventor: Keiichi Mashino, Katsuta, Japan

[73] Assignee: Hitachi, Ltd., Tokyo, Japan

[21] Appl. No.: 390,760

[22] Filed: Aug. 8, 1989

[30] Foreign Application Priority Data

Aug. 12, 1988 [JP] Japan .................. 63-199891

[51] Int. Cl.⁵ .............................. F02B 75/06
[52] U.S. Cl. .................. 123/192 R; 123/179 A; 290/40 A
[58] Field of Search ........... 123/2, 179 A, 179 M, 123/192 R, 192 B; 290/34, 51, 40 A, 4 R

[56] References Cited

U.S. PATENT DOCUMENTS

| 4,459,490 | 7/1984 | Brandon | 290/51 |
| 4,699,097 | 10/1987 | Tanaka et al. | 123/179 M |
| 4,803,376 | 2/1989 | N'Guyen | 290/31 |

FOREIGN PATENT DOCUMENTS

| 0250684 | 1/1988 | European Pat. Off. |
| 55-1431 | 1/1980 | Japan . |
| 58-185938 | 10/1983 | Japan . |
| 58-198104 | 11/1983 | Japan ...................... 123/2 |
| 60-119330 | 6/1985 | Japan . |
| 61-61930 | 3/1986 | Japan . |
| 62-255534 | 11/1987 | Japan . |

Primary Examiner—Noah P. Kamen
Attorney, Agent, or Firm—Antonelli, Terry, Stout & Kraus

[57] ABSTRACT

A method and apparatus for controlling variations of the torque developed by the crankshaft of an internal combustion engine. An ac polyphase rotating electric machine is directly connected to the crankshaft so that the ac polyphase rotating electrical machine is used as a generator when the torque of the crankshaft is increased and used as a motor when the torque is decreased. Thus, rectifiers are provided by inverters and their power supply includes a high voltage power supply capable of generating a voltage higher than a battery voltage.

9 Claims, 15 Drawing Sheets

F I G. 1
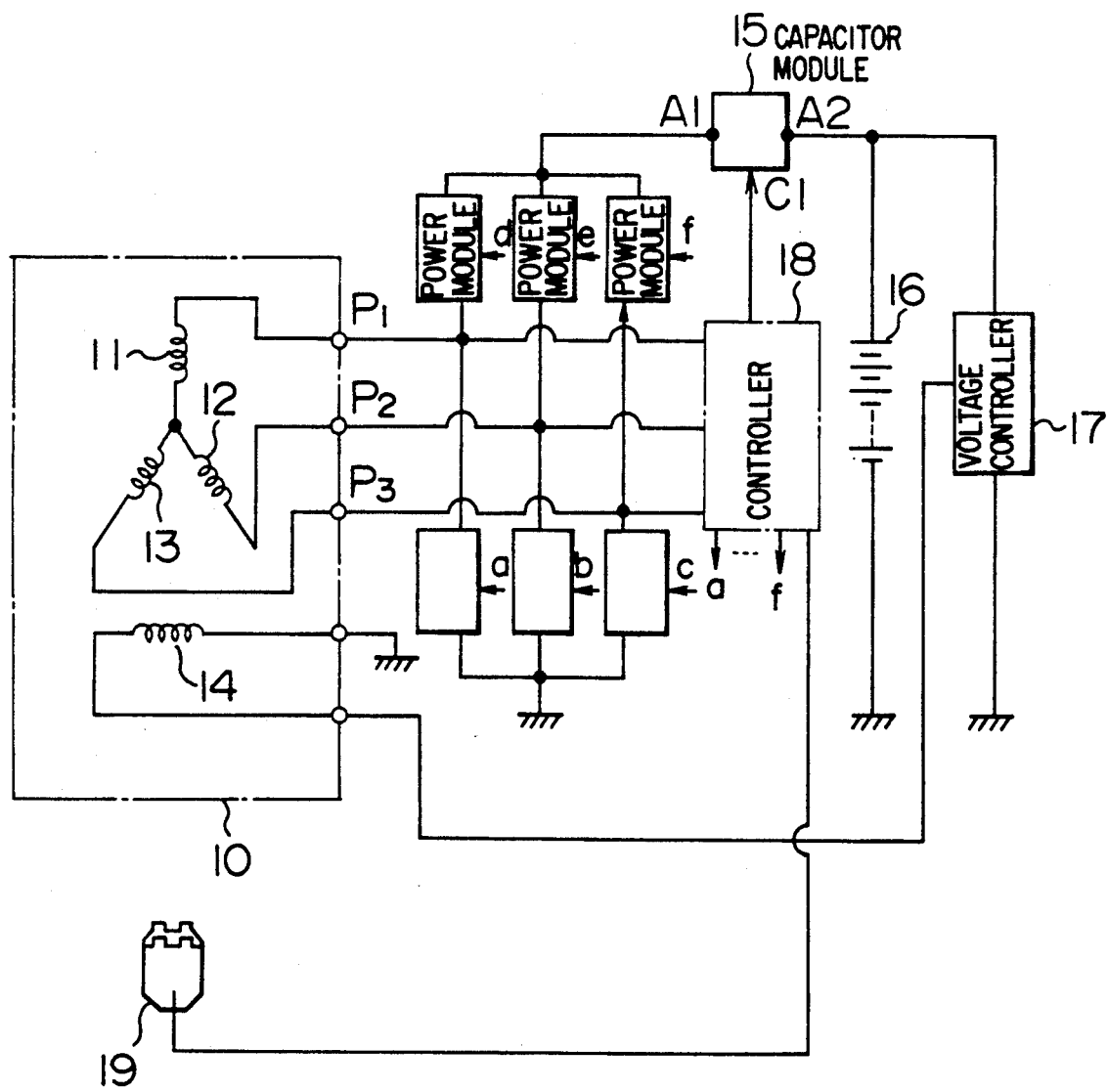

Q1, Q2, Q3 --- PHOTO INTERRUPTERS

F I G. 19
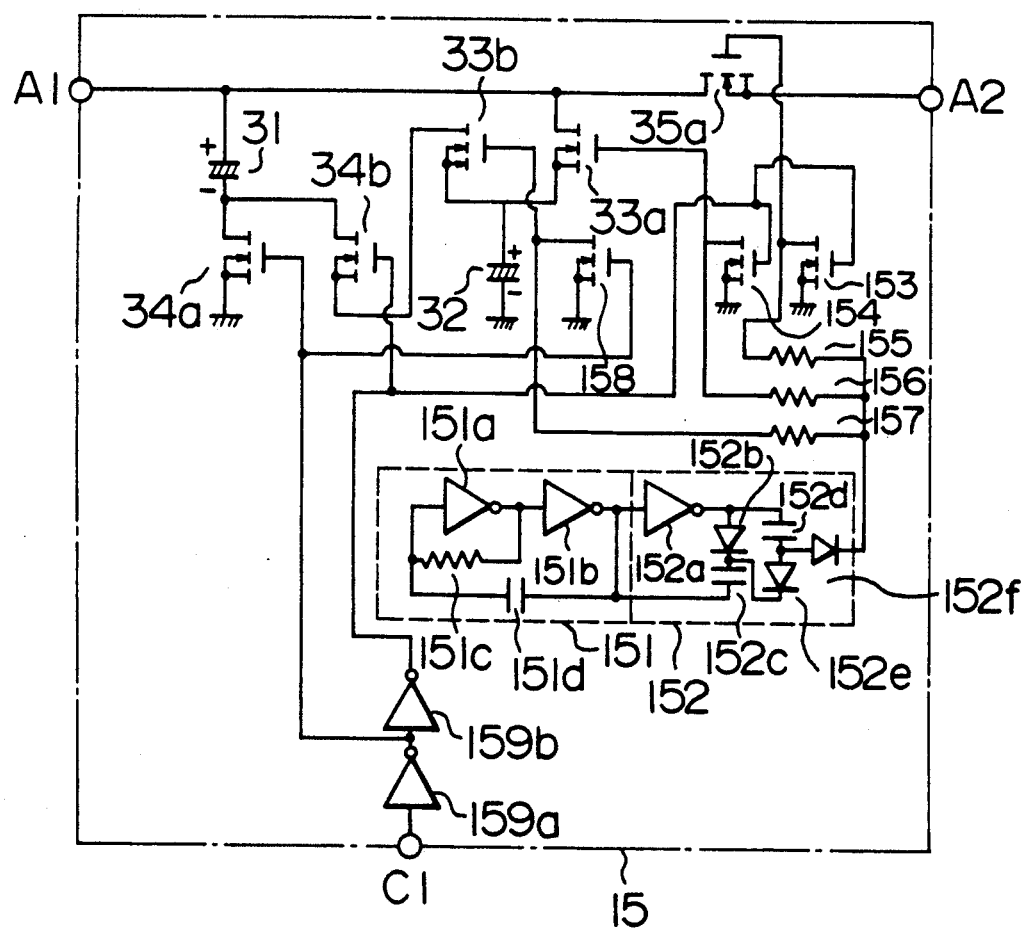

METHOD AND APPARATUS FOR CONTROLLING POWER GENERATION IN INTERNAL COMBUSTION ENGINES

BACKGROUND OF THE INVENTION

The present invention relates to an apparatus for suppressing torque variations in an internal combustion engine and more particularly to a power generation control method and apparatus for an internal combustion engine well suited for reducing torque variations caused by combustion pressure variations during the idle operation of an internal combustion of a vehicle as well as vibrations and noise induced by such torque variations.

In the past, it has been well known in the art that in an engine the variation of a cylinder pressure due to the intake and compression of a mixture and the expansion of combustion gas is not uniform with degrees of crankshaft rotation thus causing a torque variation. The torque variation results in vibrations which in turn cause deterioration in the riding comfortability of the vehicle. With a view to overcoming this deficiency, as disclosed for example in JP-A-61-61930, JP-A-58-185938 JP-A-55-1431 and JP-A-62-255534, methods have been proposed in which a counter torque is developed in the crankshaft of an engine in synchronism with an increase in the varying torque of rotation caused in the engine, thereby suppressing the variations in the torque of rotation.

In accordance with these known techniques, it is necessary to perform a series of processing steps of detecting a varying torque changing at a high speed, computing the amount of load torque required for cancelling the varying torque and applying the load torque, and no consideration is given to the time delay required for the computational operation. Also, while a generator is used as a means of cancelling the varying torque in the method of JP-A-58-185938, to produce the required torque for cancelling the varying torque of an engine necessitates the installation of a generator having an excessive capacity thus giving rise to a problem from the economy point of view. There is another problem of increasing the engine load torque and decreasing the rotational speed.

SUMMARY OF THE INVENTION

In view of the foregoing deficiencies in the prior art, it is an object of this invention to provide an improved power generation control apparatus which is capable of responding to a torque variation without delay and small in size.

To accomplish the above object, the apparatus includes a polyphase rotating electric machine having a function as a generator and a function as a motor and connected to the driving shaft of a prime mover, and inverter devices designed such that each phase functions as a generating coil when the torque of the prime mover is increased and each phase functions as a motor coil in the reverse case.

In addition, during the generator operation the output is stored in capacitor means and during the motor operation the coil is energized by the discharged energy from the capacitor means.

The timing of the inverter control is determined by monitoring the generated voltage of each phase of the rotating electric machine.

By forming the inverters with field-effect transistors, it is possible to utilize the internal parasitic diodes as the diodes for rectifiers.

BRIEF DESCRIPTION OF THE DRAWINGS

FIG. 1 is a circuit diagram of a charging generator for a vehicle according to an embodiment of the present invention, FIG. 19 is an internal circuit diagram of the capacitor module.

DESCRIPTION OF THE PREFERRED EMBODIMENTS

Figure 9:
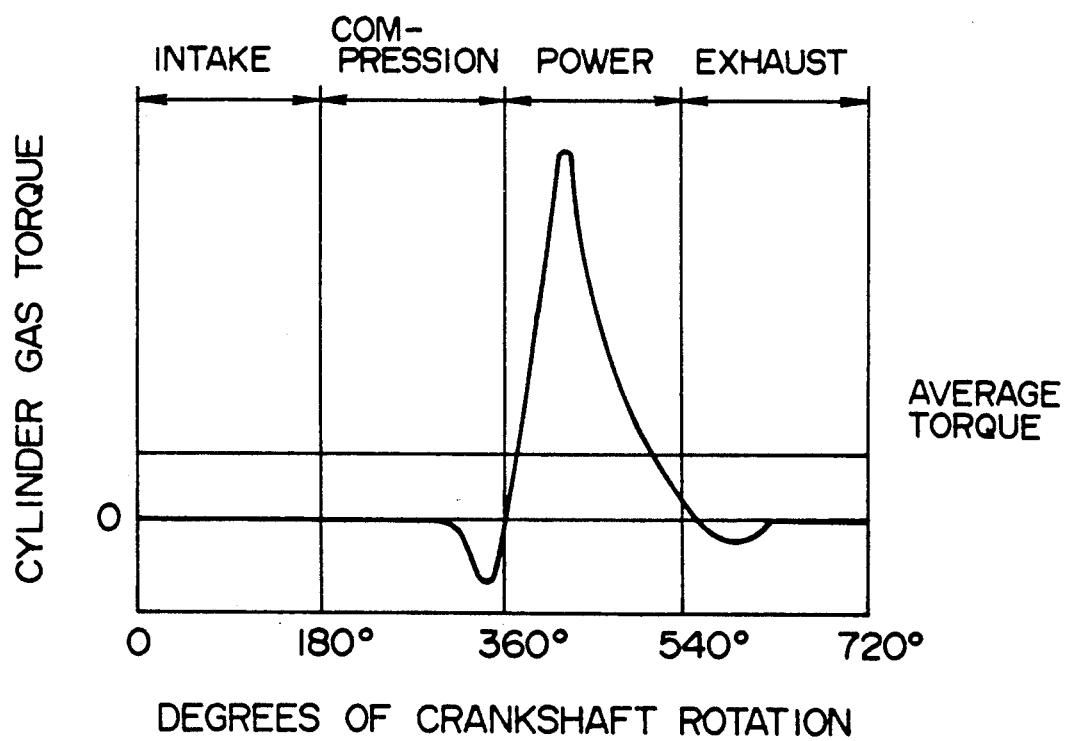
FIG. 9 shows the gas torque waveform generated from the engine proper 41 of FIG. 1.

Referring first to FIG. 9, there is illustrated an example of the varying torque curve developed in an internal combustion engine. In a four-cycle engine, the four strokes of intake, compression, power and exhaust (one complete rotation of the engine) correspond to 720 degrees (two revolutions) in terms of the degrees of crankshaft rotation and the combustion gas pressure cause a very great torque variation immediately after the ignition of the mixture. If the engine is a four-cylinder engine, the gas torque variation during each engine rotation represents an accumulation of the same torque variation repeated four times with a 180-degree delay. This gas torque variation plus an inertial torque variation due to a variation in the rotating inertia force is the varying torque actually developed in the engine.

Since the varying torque developed in the engine varies rapidly and complicatedly in dependence on the degrees of crankshaft rotation, it is difficult to vary the load torque absorbed by the auxiliary device (the generator) in a real-time manner in response to the varying torque. However, when each engine rotation is considered during the constant speed operation of the engine, the varying torque is a periodic pulsation phenomena which is repeated with each engine rotation as the period. Therefore, its value does not vary much when considered with respect to the same degrees of crankshaft rotation.

On the other hand, the difference (the residual torque) between this varying torque and the load torque absorbed by the auxiliary device (the generator) presents itself as a rotational speed variation with respect to the crankshaft so that the rotational speed is decreased when the torque on the increase. As a result, by detecting a variation in the rotational speed of the crankshaft by some means and controlling the amount of load torque to reduce the variation to zero, the residual torque can be reduced to zero and such problems as vibrations and noise can be solved. While the conventional concepts have been to control the output of the generator to reduce the residual torque to zero, the absolute value of the absorbable torque by the generator is so small that it is impossible to completely reduce the residual torque to zero. Thus, as shown in JP-A-62-255534 and U.S. Pat. Ser. No. 158,743, an attempt has been made to utilize the generator as an electric motor to externally replenish a torque when the torque developed by the engine is low and this attempt also involves the following problems, particularly with respect to the generator used on a vehicle.

(i) The generator of the engine is generally connected to the crankshaft through the pulley or the like and its pulley ratio is usually on the order of 2.1 to 2.7, that is, it is not necessarily an integer. Therefore, there is no correspondence between the rotational angle of the engine and the rotational angle of the generator and information on the rotational angle of the generator is required in addition to information on the rotational angle of the engine in order to operate the generator.

(ii) When the generator is in operation, ac voltages are generated in the armature windings so that when the generator is to be operated as a motor, voltages at least higher than the voltages generated in the armature windings must be applied in order that a sufficient torque may be developed.

The present invention is intended to provide a solution for the foregoing deficiencies encountered when the generator of the engine is sometimes used as a motor.

To attain this objective, studies have been made on the peculiar properties concerning the manner of using the generator and the following findings have been obtained.

(i) When operating the generator as the motor, it must be done only during the operation of the generator.

While the pole positions during the starting period must be detected in the ordinary synchronous motor, in the case of the present invention intended to reduce pulsations in the rotation of the engine the ac voltages are always generated in the armature windings and thus it is possible to detect these ac voltages to detect the rotational angle of the generator.

(ii) It is only necessary to temporarily store the output of the generator in storage means so that the stored energy is taken out when operating the generator as a motor. Particularly, since this process is performed at a high speed in synchronism with the engine rotation, the capacity of the storage means need not be so large and capacitors or the like can operate it satisfactorily for the purpose.

Figure 10:
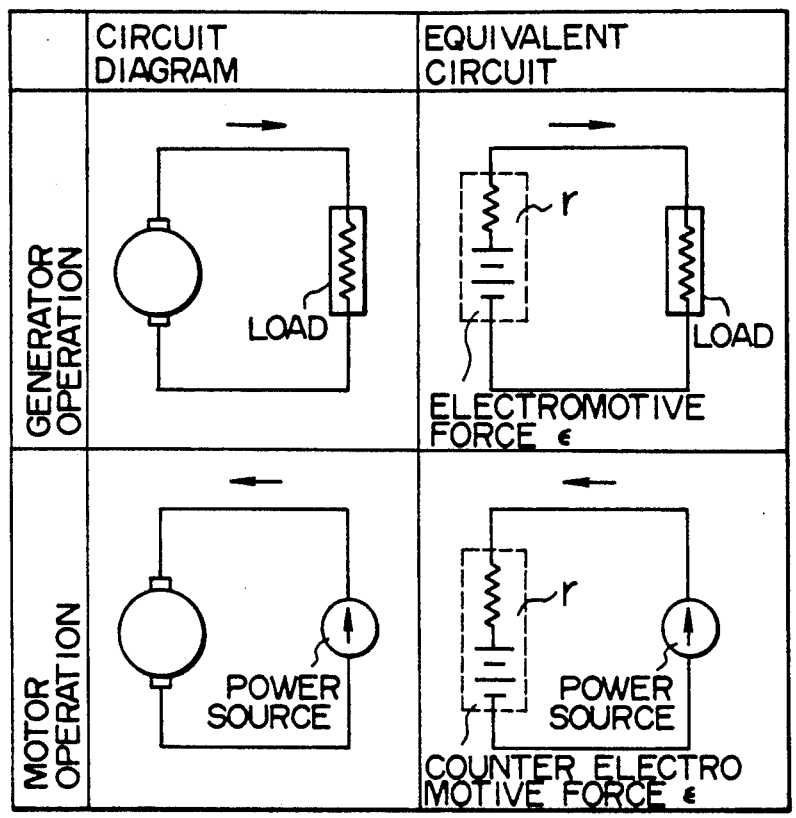
FIG. 10 is a diagram showing the operation switching principle of the circuit in FIG. 1.

FIG. 10 shows circuit diagrams of the generator and their equivalent circuit diagrams. FIG. 10 shows the operation of the dc machine in terms of principle. When the machine is performing the generator operation of (a), a current is supplied to an external load through an internal resistor r with respect to an electromotive force z. On the other hand, it is noted that also when the motor operation of (b) is performed, the electromotive force z is present in the form of a counter electromotive force and the voltage of the electromotive force is the same although the direction of current flow is different. This electromotive force is given by the formular of electromagnetic induction, as follows $$\epsilon \propto N \bullet \Phi \bullet T \tag{1}$$

where N = rotational speed
$\Phi$ = magnetic flux
T = number of turns in armature winding In the case of a polyphase ac generator, the same effect as the dc machine can be obtained by detecting the potential difference between the respective phases to detect that phase which is to be energized.

As embodiment of the present invention will now be described with reference to FIG. 1.

FIG. 1 illustrates a circuit diagram of the charging generator of a vehicle. Numeral 10 designates an ac generator which includes three phase armature windings 11, 12 and 13 and a field winding 14. Symbols a, b, c, d, e and f designate power modules for effecting the energization of the three-phase armature windings 11, 12 and 13 and the rectification (the details will be described later). Numeral 15 designates a capacitor module for storing the generated output (the details will be described later). Numeral 16 designates a battery for supplying power to a starter (not shown) and other electric devices. Numeral 17 designates a voltage controller for controlling the current flowing in the field winding 14 to adjust the voltage of the battery 16 to a constant value. Numeral 18 designates a controller for performing the control of switching the generator 10 to operate as a motor, the detection of an engine rotation variation and the learning control (the details will be described later) Numeral 19 designates a distributor for generating an engine crankshaft rotational angle signal by its internal crank angle sensor.

Figure 2:
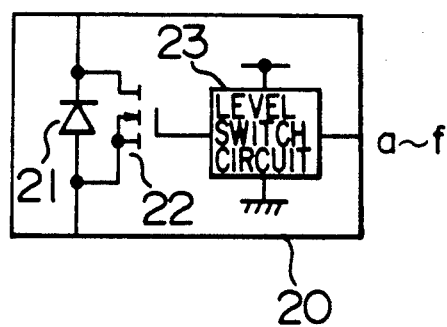
FIG. 2 is an internal circuit diagram for the power modules a, b, c, d, e and f of FIG. 1.

FIG. 2 is an internal circuit diagram for the power modules a, b, c, d, e and f in FIG. 1, and the circuit includes a diode 21, an N-channel power MOS 22 and a level-shift circuit 23. When the signal from the controller 18 is received, the power MOS 22 is turned on.

Figure 3:
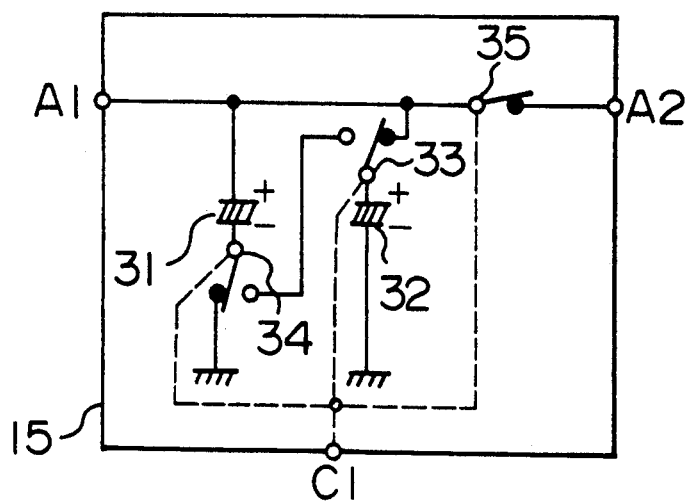
FIG. 3 is an internal circuit diagram for the capacitor module 15 of FIG. 1.

FIG. 3 is an internal circuit diagram of the capacitor module 15 in FIG. 1, and the capacitor module 15 includes capacitors 31 and 32 and switches 33, 34 and 35. The on and off conditions of the switches 33, 34 and 35 are controlled by the voltage at a control terminal $C_1$.

Figure 4:
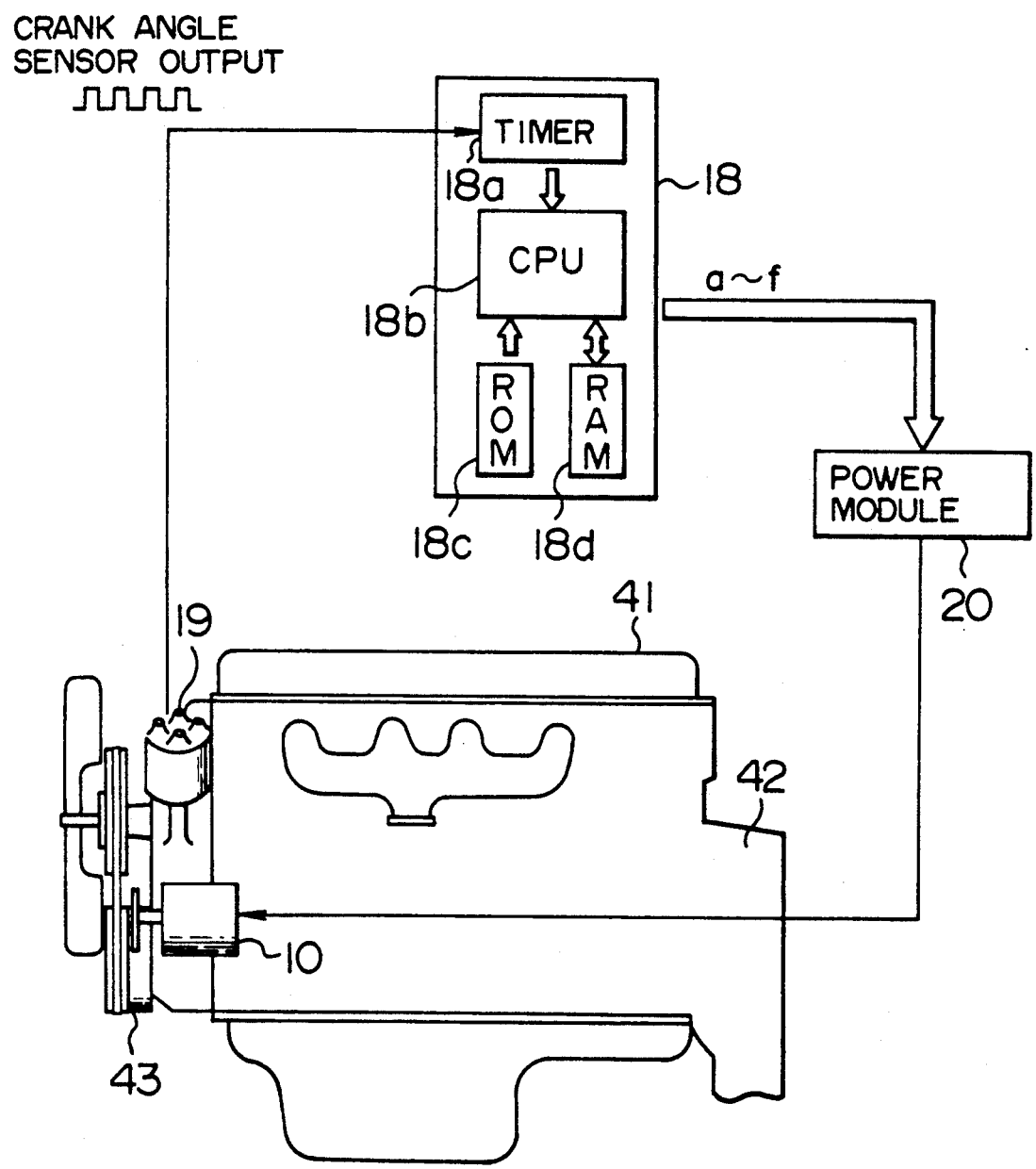
FIG. 4 is a diagram showing the positional relations of units and devices around the engine in the embodiment of FIG. 1, FIGS. 5 and 6 respectively show the output waveform of the crank angle sensor 19 in FIG. 1 and the rotational speed variation waveform of the engine.

FIG. 4 illustrates the positional relations of various units and devices around an internal combustion engine 41 which includes an engine proper 42, the distributor 19 and the generator 10 integrally mounted on the engine proper 42 and operated from the engine 41 by a V-belt 43. Since the controller 18 detects a varying torque of the engine 41 in the form of a rotational speed variation, it clocks the output pulses of the crank angle sensor to compute a momentary rotational speed variation value and then it determines the necessary generator operation-motor operation switching crank angle for reducing the rotational speed variation value to zero, thereby sending the necessary signal to the selected power module.

The operation performed by the above-described construction will now be explained in greater detail.

Figure 5:
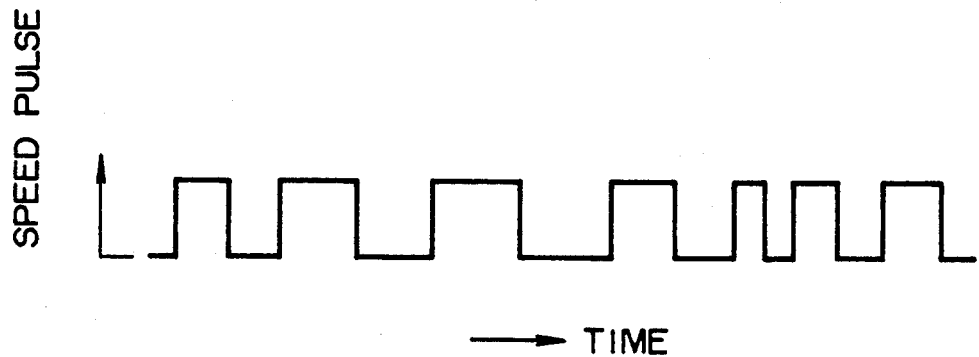
Figure 6:
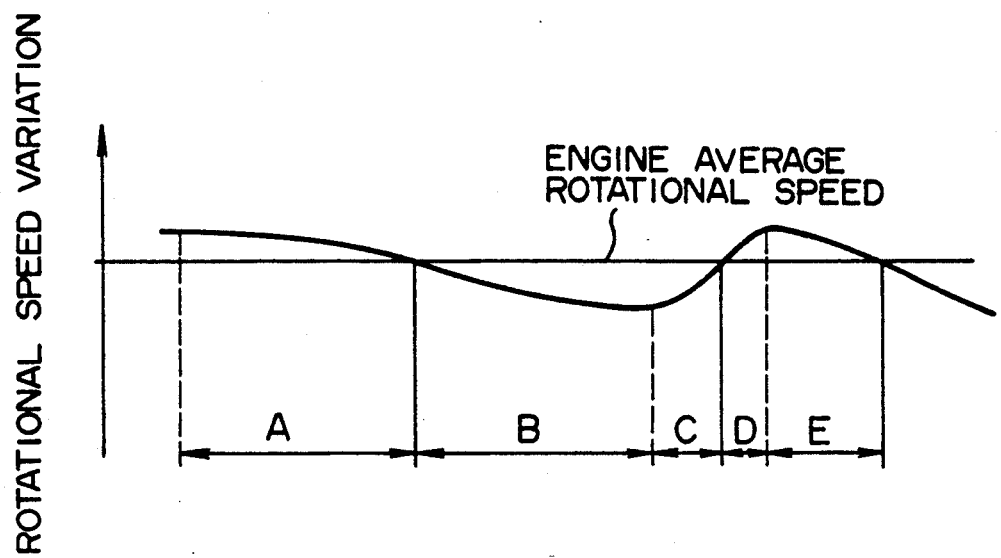

FIG. 5 shows the speed pulses produced by the crank angle sensor. As shown in the Figure, the pulse width pulsates when the crankshaft produces a rotational speed variation. The flow chart necessary for determining a variation in the rotational speed is shown by a step 710 in FIG. 7. The pulse width of this pulsating pulse is measured by a timer 18a in the controller 18 and a CPU 18b determines a momentary rotational speed from its reciprocal number Also, the number of pulses corresponding to one engine rotation is counted by the counter incorporated in the timer 18a to determine the period of one engine rotation and thereby to obtain an average engine speed. Then, at a step 720 in FIG. 7, the deviation between the two speeds is computed to determine a momentary rotational speed variation (see FIG. 6).

Then, a transfer is made to a step 730 which determines whether the deviation speed is positive or negative. If the value of $\Delta v_x$ is positive, a transfer is made to a step 740 which changes the operation switching command to a "generator operation" command At this time, the power MOSs 22 of FIG. 2 are turned off and also the switches 33, 34 and 35 of FIG. 3 are each thrown to its normally-closed contact position. When this occurs, the ac voltages generated in the three-phase armature windings 11, 12 and 13 are all full-wave rectified by the diode 21 and they are then supplied to the battery 16 through the switch 35. Also, they charge the capacitors 31 and 32 through the switches 34 and 33, respectively. In this condition, the battery 16 and the capacitors 31 and 32 are loads on the generator 10.

On the other hand, when the value of $\Delta v_x$ is negative, a transfer is made to a step 750 which changes the operation switching command to a "motor operation" command. When this occurs, a command for changing the contacts of the capacitor module 15 of FIG. 3 is generated from the $C_1$ terminal of the controller 18 and the switches 33, 34 and 35 are each thrown to its normally-open contact position As a result, the terminals $A_1$ and $A_2$ of the capacitor module 15 are disconnected and the capacitors 31 and 32 are connected in series. The voltage at the terminal $A_1$ becomes about two times the voltage of the battery 16 and the diodes 21 are reverse biased, thereby stopping the current flow.

Figure 11:
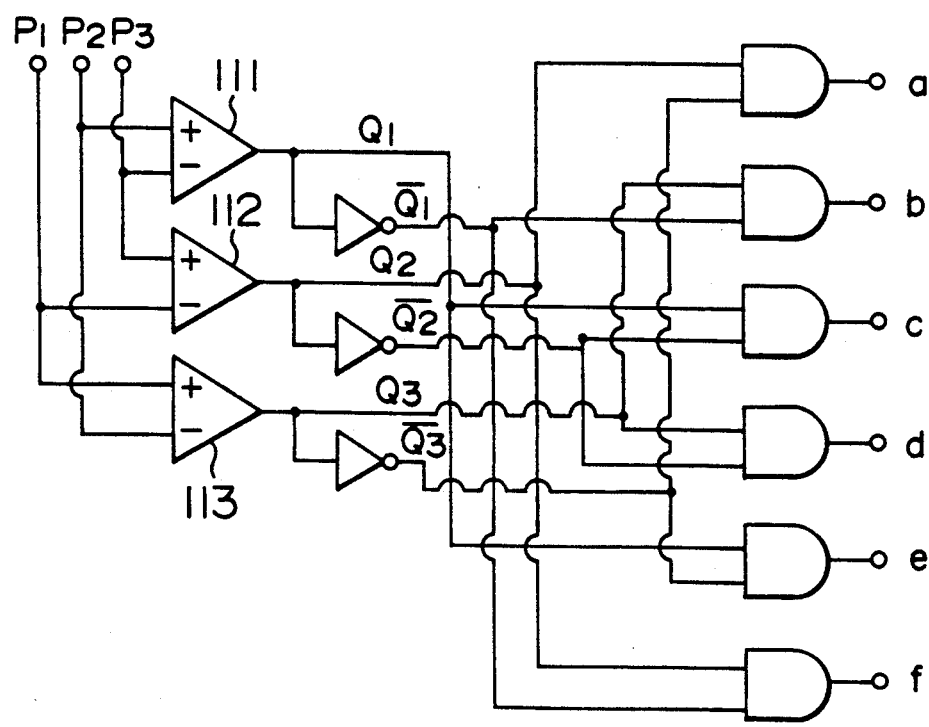
FIG. 11 is a block diagram showing the operation of the step 770 in FIG. 1.

Then, a transfer is made to a step 760 where an energization selector circuit is brought into operation. The energization selector circuit is a circuit for determining which one of the power MOSs 22 of the power modules a to f is to be turned on and it can be realized with a circuit such as shown in FIG. 11. The operating principle of the circuit is shown in FIG. 12.

Figure 12:
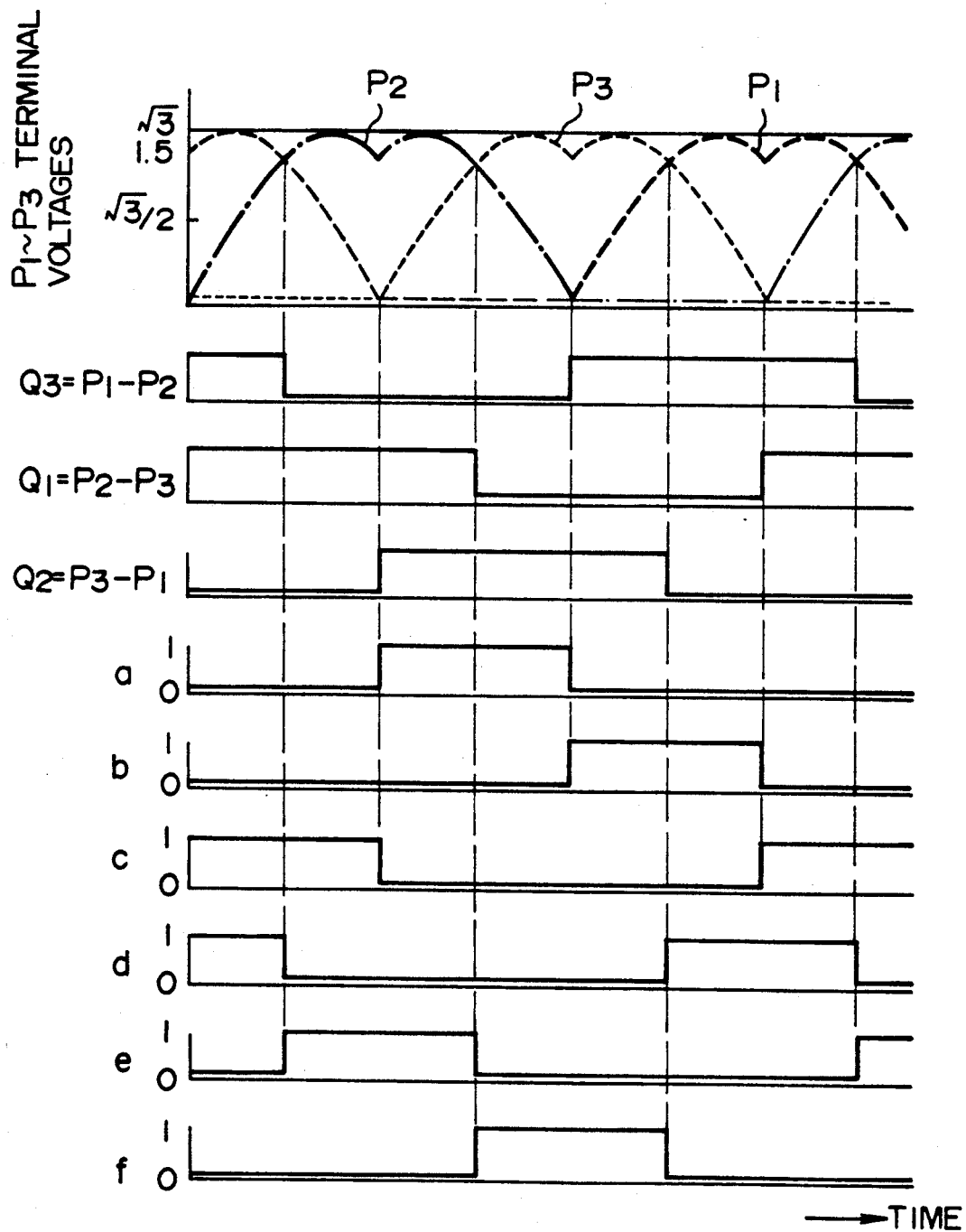
FIG. 12 is a time chart for the block diagram of FIG. 11.

In FIG. 12, designated by $P_1$, $p_2$ and $p_3$ are the ac voltage waveforms generated in the respective phases of the armature windings 11, 12 and 13 showing that when the waveform designated as a, b, c, d, e or f in FIG. 12 is in a "1" state, the corresponding power MOS 22 of the power module 20 is to be turned on. For instance, the waveform a goes to "1" when the potential at the terminal $P_1$ is lower than those at the terminals $P_2$ and $P_3$. In order to select one of the power modules to be turned on in accordance with the voltages at the terminals $P_1$, $P_2$ and $P_3$, the following computations are performed by using comparators 111, 112 and 113

$$Q_1 = \begin{cases} 1 & (P_2 > P_3) \\ 0 & (P_2 < P_3) \end{cases} \tag{2}$$

$$Q_2 = \begin{cases} 1 & (P_3 > P_1) \\ 0 & (P_3 < P_1) \end{cases} \tag{3}$$

$$Q_3 = \begin{cases} 1 & (P_1 > P_2) \\ 0 & (P_1 < P_2) \end{cases} \tag{4}$$

Then, it is necessary to perform the following logical operations by using $Q_1$, $Q_2$ and $Q_3$.

$$a = Q_2 \cdot \overline{Q}_3 \tag{5}$$

$$b = Q_3 \cdot \overline{Q}_1 \tag{6}$$

$$c = Q_1 \cdot \overline{Q}_2 \tag{7}$$

$$d = Q_3 \cdot \overline{Q}_2 \tag{8}$$

$$e = Q_1 \cdot \overline{Q}_3 \tag{9}$$

$$f = Q_2 \cdot \overline{Q}_1 \tag{10}$$

The circuit of FIG. 11 performs the computations of the previous equations (2) to (10). In accordance with the above-mentioned procedure, any one of the power MOSs 22 is selected and turned on and its current is taken out through the series-connected capacitors 31 and 32.

Figure 8:
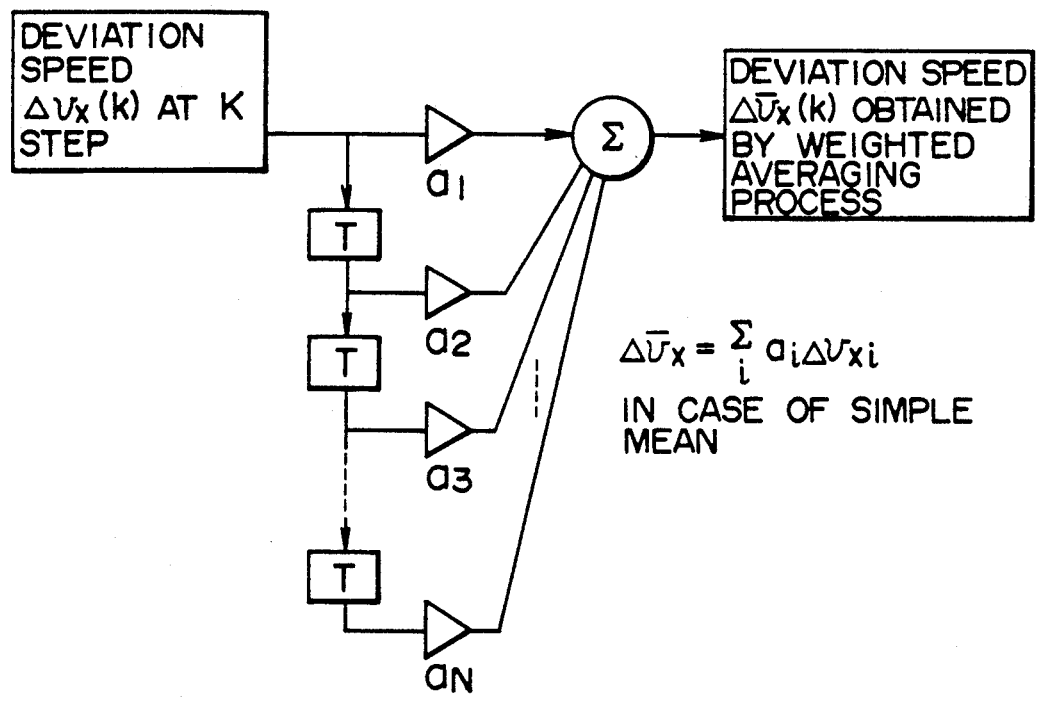
FIG. 8 is a block diagram representing the concept of the learning control at the step 770 of FIG. 7.

Then, a transfer is made to a step 770 where the operation switching command at each rotational angle is stored. At this time, a learning control is performed on the basis of the past rotation information. FIG. 8 illustrates this method Now, let us calculate the weighted moving average of deviation speed data $\Delta v_x(k)$ at a certain crankshaft rotational angular position k over past several rotations.

$$\Delta \overline{v_x}(k) = \sum_{i=0}^{N} a_i \cdot \Delta v_x(k)_i \tag{11}$$

Such averaging process can be performed by employing a linear non-cyclic type digital filter such as shown in FIG. 8. Here, designated by $a_1$ is a weighting factor. This is formed by a multiplier 80, a one period delay element and an adder 82 for the input data $\Delta v_x$. In this case, if $a_1 = a_2 = \ldots a_n = (1/N)$, equation (11) represents a simple mean. If the control is effected according to such averaging process, rotational speed variations of the crankshaft are periodic so that even if any accidental variation component occurs, instability of the control performance due to the accidental variation component can be minimized.

Figure 7:
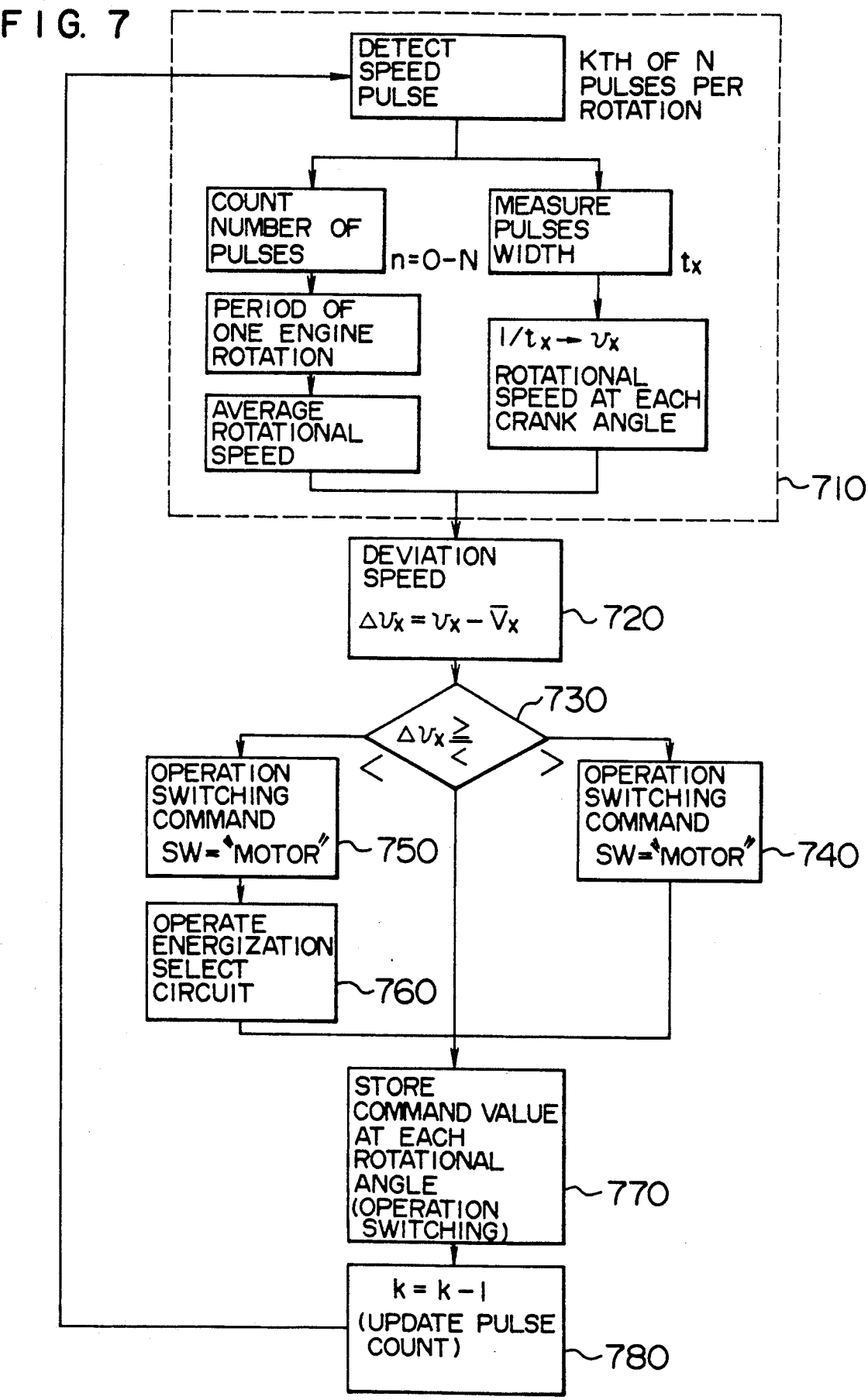
FIG. 7 is a flow chart showing a control flow of the controller 18 in FIG. 1.

Referring again to the flow chart of FIG. 7, a transfer is made to a step 780. Here, a wait is made until an advanced region of the engine crank angle so that when a crank angle signal is detected, a return is made to the step 710 thereby repeating the above-mentioned loop.

By repeating the loop, any irregularity in the developed torque of the engine can be eliminated and the engine vibrations are reduced. In particular, the vibrations in the compartment of the automobile during the idling operation are reduced with the resulting improvement in the riding comfortability.

While, in the present embodiment, the switches 33, 34 and 35 take the form of mechanical switches, semiconductor devices such as transistors may be employed to effect the switching at a higher speed Thus, by controlling the duration time of energization, it is possible to adjust the amount of torque developed by the generator as a motor. In this case, the torque variations can be suppressed analogically with the resulting decrease in the higher order rotational vibrations.

Figure 13:
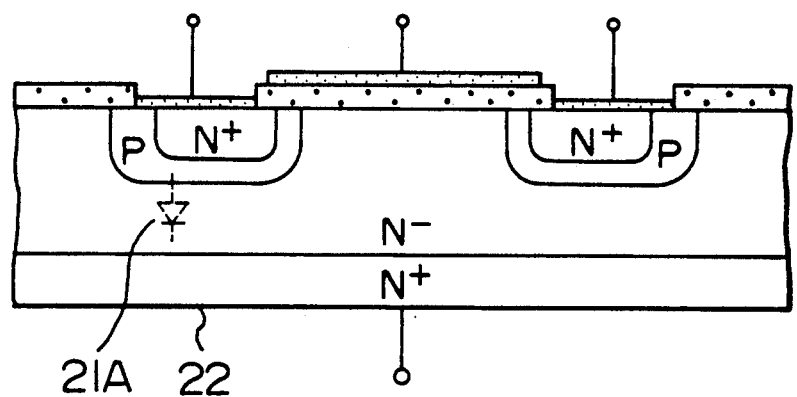
FIG. 13 is a diagram showing the construction of the circuit of FIG. 2 realized with a single semiconductor chip.
Figure 13:
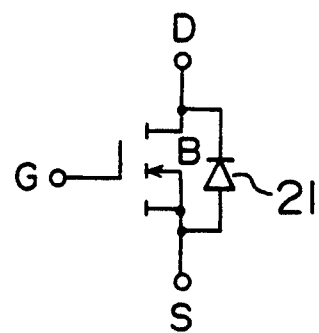

Further, it is known in the art that where the power module shown in FIG. 2 is realized with a vertical structure MOS such as shown in FIG. 13, generally a parasitic diode shown at 21A is formed. By utilizing this parasitic diode as an ac power rectifying diode, it is possible to simultaneously form the necessary power elements for generator and motor operation purposes by the use of a single semiconductor chip thereby decreasing the number of components. The present embodiment shows an exemplary semiconductor construction conforming with the intended use of the present invention in which the generator serves as a motor as well.

Figure 14:
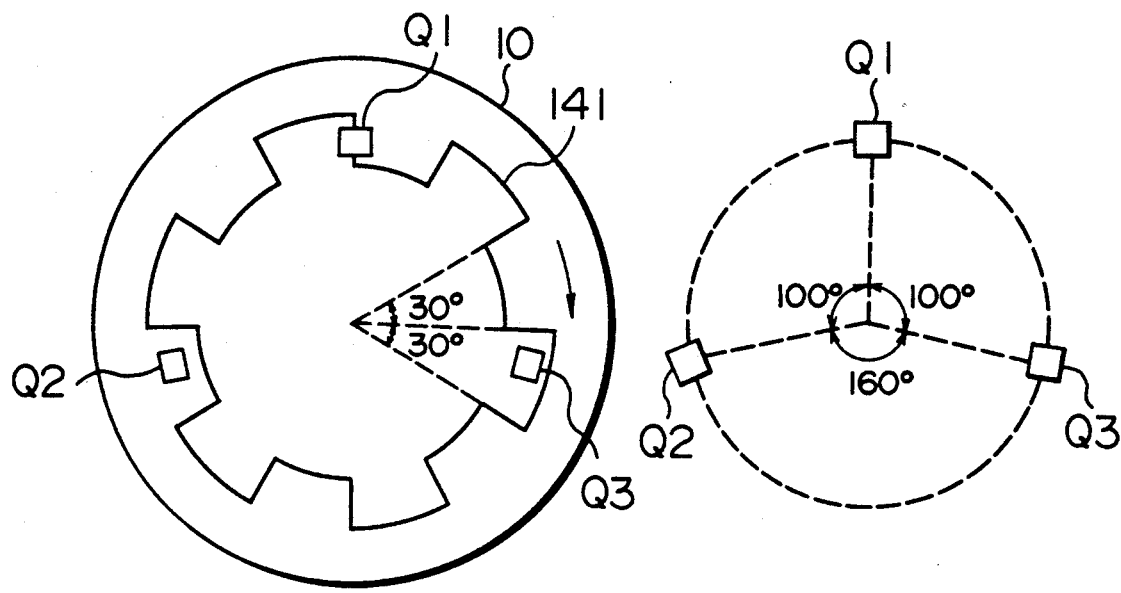
FIGS. 14 and 15 are diagrams showing a second embodiment of the rotational angle detector.
Figure 15:
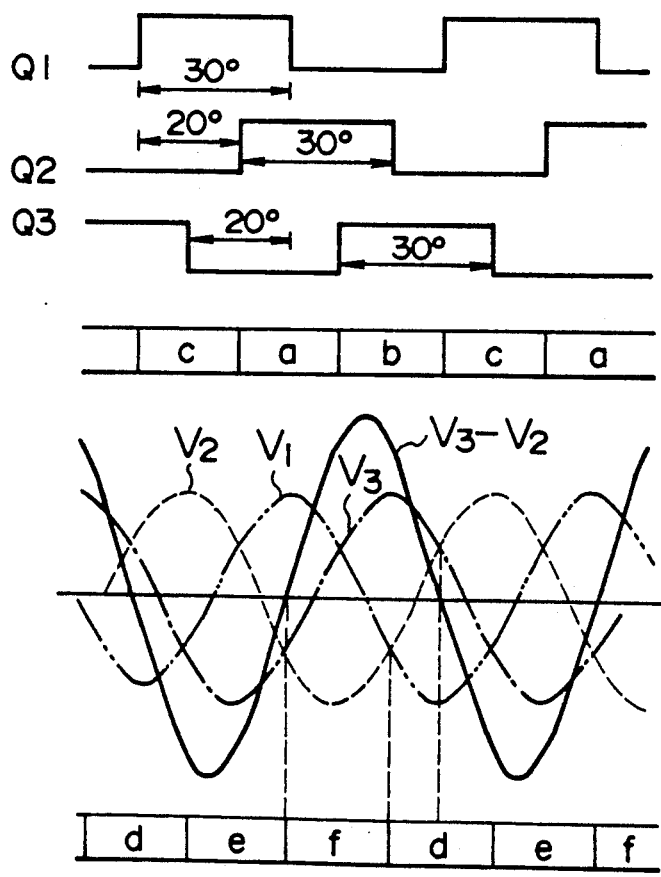

A second embodiment of the present invention will now be described with reference to FIGS. 14 and 15. FIG. 14 shows an ac generator 10 as looked from the driving shaft side and the ac generator 10 is added with a rotating shield plate 141 and photo interrupters $Q_1$, $Q_2$ and $Q_3$ mounted on the ac generator 10. FIG. 14 shows an electrical angle detector for a 12-pole ac generator and each of the photo interrupters is shielded or coupled every 30 degrees of rotation. The photo interrupters $Q_1$, $Q_2$ and $Q_3$ are in such positional relation that $Q_2$ and $Q_3$ are displaced by 200° from each other on both sides of $Q_1$. With this positional relation, when the shield plate 141 is rotated clock-wise, the photo interrupters $Q_1$, $Q_2$ and $Q_3$ generate waveforms which are respectively shifted in phase by 10 degrees as shown in FIG. 15. Assuming that designated as $v_1$, $v_2$ and $v_3$ in FIG. 15 are the ac voltage waveforms generated in armature windings 11, 12 and 13, it will be seen that the interphase voltage $v_3 - v_2$ has a waveform synchronized with $Q_1$ and it becomes the same with the waveform $Q_1$ of FIG. 11. By using the same circuit as the logical circuit of FIG. 11, drive signals a to f are generated. The electrical angle detecting circuit of FIG. 14 is advantageous in that the accurate detection of electric angles is ensured even if the current flow in the armature is increased. Generally, the armature winding is represented by a series circuit of an electromotive force $\epsilon$ and an internal resistor r as shown in FIG. 11 and a terminal voltage $V_0$ is given as follows (a) Generator operation: $\quad V_0 = \epsilon - I_0 \cdot r \quad$ (12)

(b) Motor operation: $\quad V_0 = \epsilon + I_0 \cdot r \quad$ (13)

Here, designated as $I_0$ is the armature current and an increase in the value of $I_0$ increases the voltage difference between the cases (a) and (b) thus giving rises to the danger of shifting the phases to be detected In accordance with the embodiment of FIG. 14, however, this problem is solved by the detection of mechanical angles.

Figure 16:
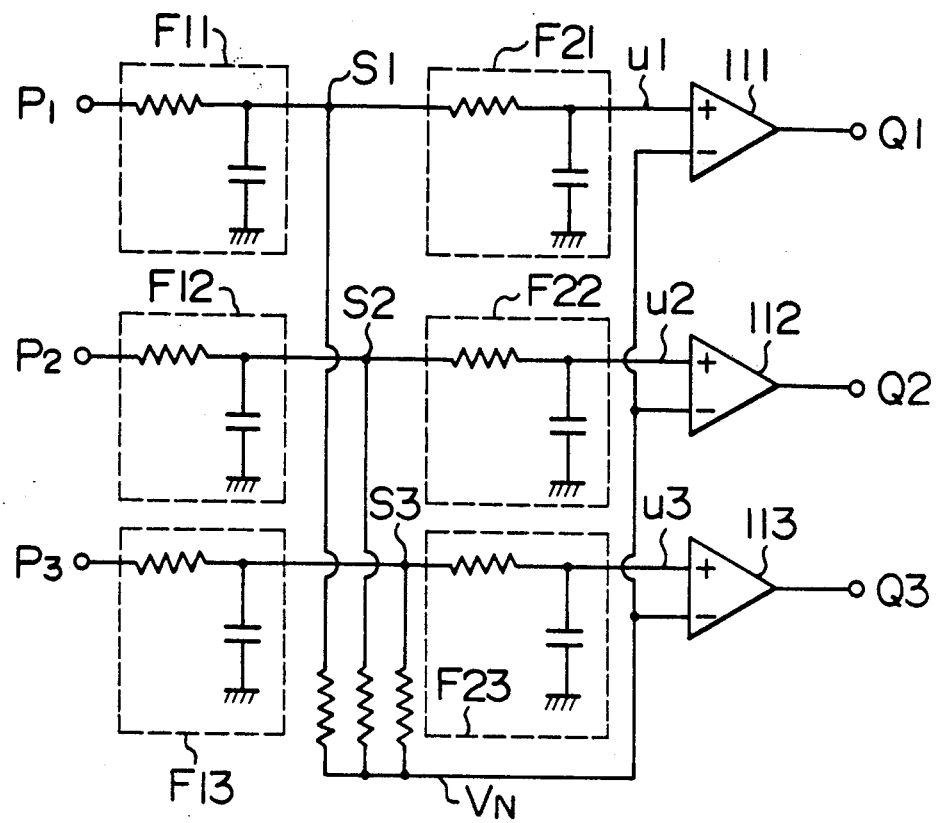
FIG. 16 is a circuit diagram of a detection circuit for the detector of FIG. 14.
Figure 17:
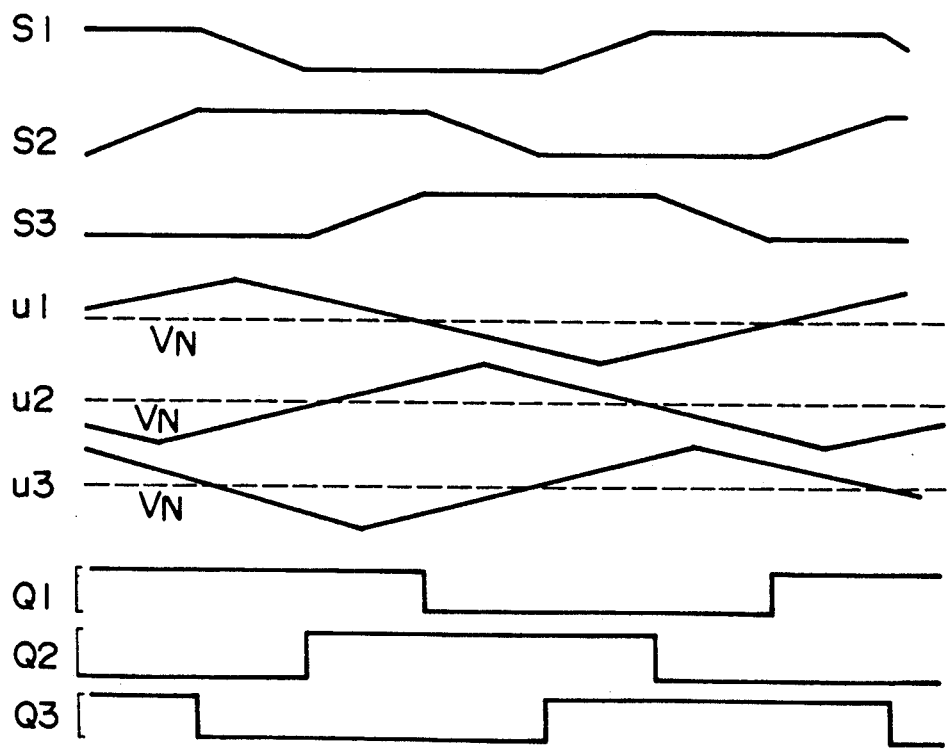
FIG. 17 shows the voltage waveforms at various parts of FIG. 16.

As a means of electrically solving the above problem, the application of the method used in the inverter control technique may be used. This method is made known in the art by JP-A-62-123980 etc., and its exemplary circuit is shown in FIG. 16. In the Figure, numerals 11, 12 and 13 designate comparators which are the components common with FIG. 11. In the circuit of FIG. 16, low-pass filters $F_{11}$, $F_{21}$, $F_{12}$, $F_{22}$ and $F_{13}$, $F_{23}$ are respectively connected between the terminals $P_1$, $P_2$ and $P_3$ and the comparators 11, 12 and 13 of FIG. 11. Also, the neutral point $V_N$ of each phase is employed as a reference voltage and the operation of comparison is performed on it by the comparator 11, 12 or 13. FIG. 17 shows the voltage waveforms generated at various points in the present embodiment. The phase is delayed by the low-pass filter circuit and this delay cancels the phase lead due to the armature current, thereby ensuring the computation of the proper electrical angle. While, in the present embodiment, the analog filters are used to provide the desired phase compensation, it is possible to use digital filters or perform the equivalent computations by a micro computer or the like after the operation of A-D conversion.

Figure 18:
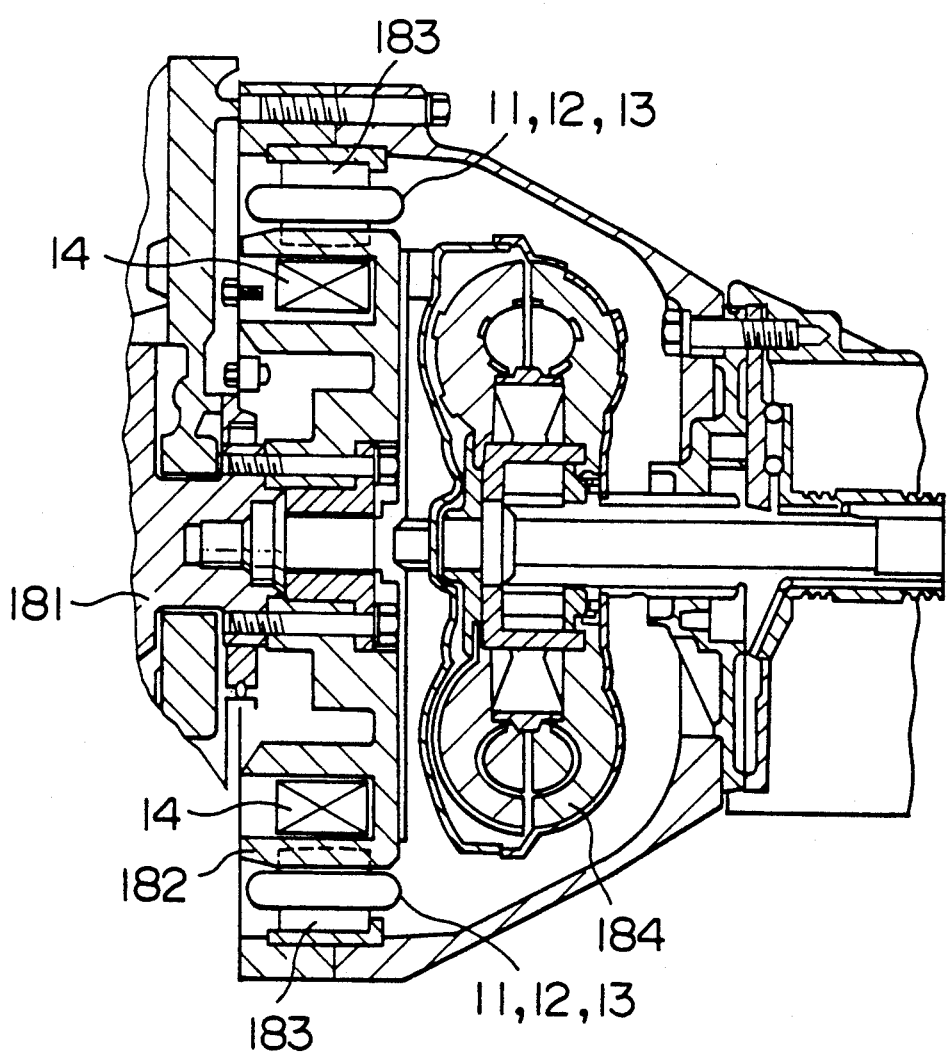
FIG. 18 shows another embodiment of the present invention showing a case in which the rotating electric machine is directly connected to the engine.

Also, another method of multiplying the ratio between the rotational speeds of the engine and the ac generator by an integer may be cited as an excellent method of detecting an electrical angle. FIG. 18 shows an example of such method in which the ac generator is directly mounted on the crankshaft 181 of the engine. In this embodiment, there is one-to-one correspondence between the rotational angles of the engine and the ac generator 10 and therefore the electrical angle of the ac generator 10 can be easily detected by means of the crank angle sensor signals from the distributor 19. In the case of FIG. 18, the brushless generator is mounted on the crankshaft 181 and its rotor 182 rotates simultaneously with the crankshaft 181. Also in this embodiment, a torque converter 184 is directly connected to the crankshaft 181 thereby contributing toward simplifying the construction of the automatic transmission. The present embodiment has an economical effect of eliminating the use of any electrical angle detecting circuit, and also the fact that the generator 10 is directly connected to the torque converter 184 has the effect that vibrations due to the engine torque variations are not easily transmitted to the outside of the engine mount thereby further enhancing the vibration reducing effect While, in this embodiment, the structure of the crankshaft direct-coupled type is used, it may be replaced with a gear-driven structure.

Referring now to FIG. 19, there is illustrated an internal circuit diagram of the capacitor module 15 shown in FIG. 3. In FIG. 19, numerals 31 and 32 designate the capacitors and the switches 33 and 34 of FIG. 3 are replaced with power MOSs 33a, 33b and 34a 34b, respectively. Numeral 35a designates a power MOS and this semiconductor device replaces the switch 35 of FIG. 3. Numeral 151 designates a known type of oscillation circuit composed of C-MOS gates and it includes Not gates 151a and 151b, a resistor 151c and a capacitor 151d thereby generating a rectangular waveform at the output terminal of the Not gate 151b. Numeral 152 designates a known type of charge pump circuit including a Not gate 152a, diodes 152b, 152e and 152f and capacitors 152c and 152d whereby charges are successively stored in the capacitors 152b and 152f by the rectangular signal from the oscillation circuit 151 and a voltage higher than the supply voltage is generated thereby applying a charge to the gates of the power MOSs 35a, 33a and 33b, respectively, through resistors 155, 156 and 157, respectively. Since the source electrodes of the power MOSs 33a, 33b, 34b and 35a are not grounded, a voltage sufficiently higher than the positive electrode potential of the battery 16 must be applied to their gate electrodes. Numerals 159a and 159b designate Not gates, and 153, 154 and 158 MOS transistors for discharging the gate charges on the associated power MOSs. When the terminal $C_1$ goes to the high level, the output of the Not gate 159a goes to the low level and the output of the Not gate 159b goes to the high level. Thus, the power MOSs 34a and 33a are turned on and the capacitors 31 and 32 are charged parallely. On the contrary, when the terminal $C_1$ goes to the low level, the reverse operation is performed so that the power MOSs 34b, 33b and 35a are turned on and the charges stored in the capacitors 31 and 32 are delivered to the terminal $A_1$.

In accordance with the present embodiment, a booster circuit and a switching circuit are formed by using only semiconductor devices and therefore it is possible to provide an apparatus which is high in reliability.

Figure 20:
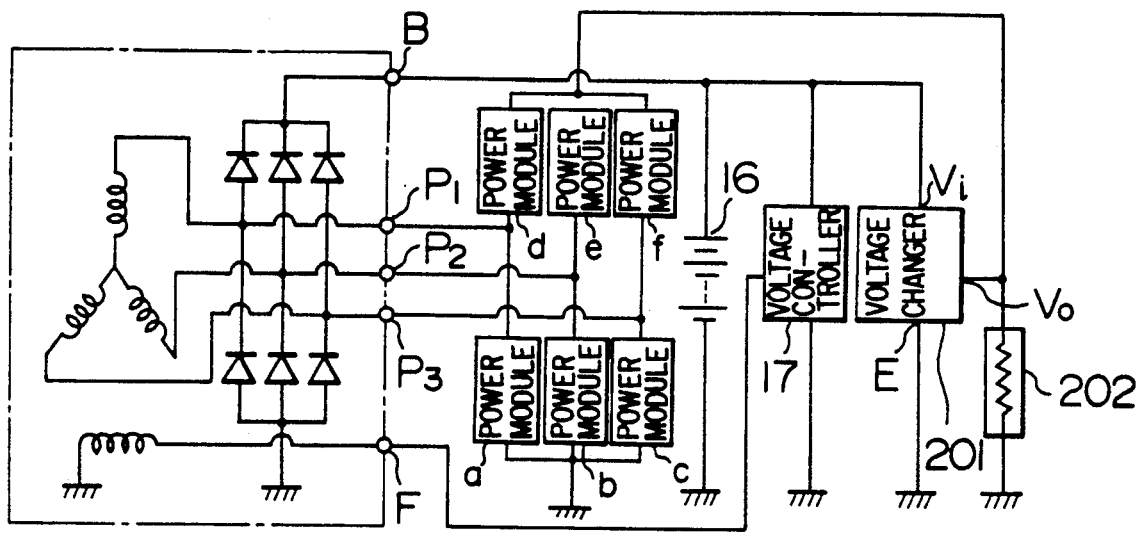
FIG. 20 is a circuit diagram showing another embodiment of the present invention.

Referring to FIG. 20, there is illustrated still another embodiment of the present invention. FIG. 20 is a circuit diagram of a charging generator for a vehicle. The component parts designated by the same reference numerals as in FIG. 1 show the component parts of the same functions. In FIG. 20, numeral 201 designates a voltage changer for receiving the voltage of the battery 16 to generate a higher voltage. When the generator 10 is performing the generator operation, the battery 16 is charged through the three-phase full-wave rectifier 15. On the contrary, during the motor operation the three-phase armature windings 11, 12 and 13 are energized by a high voltage from the output $V_o$ of the voltage changer 201 through the power modules a, b, c, d, e and f.

Figure 21:
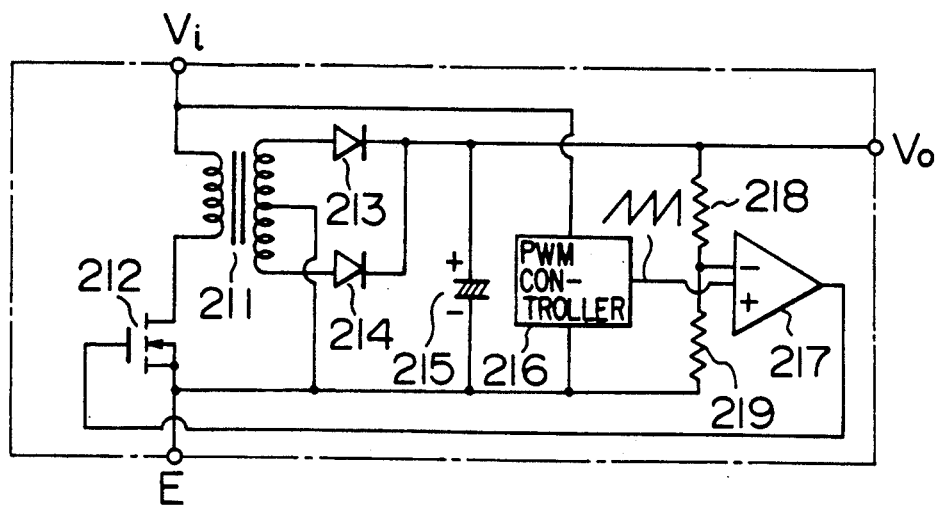
FIG. 21 is a circuit diagram of the voltage changing circuit of FIG. 20.

In the present embodiment, the output of the voltage changer 201 can be connected to a load 202 (e.g., an electric heater) to utilize the high voltage power source in applications other than the torque variation control apparatus. Referring now to FIG. 21, there is illustrated an internal circuit diagram of the voltage change 201 in FIG. 20. This circuit is a switching regulator employing a PWM (pulse width modulation) controller 216 whereby the primary input of a transformer 211 is subjected to switching control by a power MOS 212 and the secondary output of the transformer 211 is rectified by diodes 213 and 214, thereby applying a dc output to a capacitor 215. Then, the output voltage is detected by resistors 218 and 219 and then compared with the sawtooth output of the PWM controller 216 by a comparator 217, thereby controlling the duty cycle of the power MOS 212 to adjust the output voltage at a constant value.

In accordance with the present embodiment, the voltage changer for high voltage power supply purposes is concurrently used as the power supply for the power generation control apparatus with the resulting decrease in the number of component parts, and therefore there is economical effect of decreasing the cost of the apparatus.

I claim:

1. A power generation control apparatus for an internal combustion engine comprising:
   an ac generator including a plurality of armature windings and driven by said engine;
   power storage means for storing power supplied from said ac generator;
   a selector circuit for detecting an electromotive force difference generated by said plurality of armature windings to select one of said windings to be energized;
   a plurality of rectifiers for respectively rectifying outputs of said plurality of armature windings;
   a plurality of switch elements connected in parallel with said plurality of rectifiers to apply the power stored in said power storage means to said selected armature winding in response to a signal from said selector circuit;
   a position sensor for detecting a rotational angle of said engine; and
   a control unit responsive to a rotational speed signal generated by differentiating an engine rotational speed signal generated by said position sensor to control in such a manner that a generated output from said armature windings is supplied to said power storage means through said plurality of rectifiers to apply a rotational load to said engine when said rotational speed is greater than a time average value thereof and the power from said power storage means is selectively supplied to said armature windings through said plurality of switch elements to supply a torque to said engine when said rotational speed is smaller than said time average value.

2. An apparatus according to claim 1, wherein said control unit has a learning function of computing a rotational speed variation obtained as a difference between an actual rotational speed in terms of degrees of crankshaft rotation of said engine and an average rotational speed obtained by averaging said rotational speed during one rotation of said engine, and controlling in accordance with rotational speed variation information over at least one previous rotation of said engine to switch said ac generator to operate as a generator or a motor.

3. An apparatus according to claim 1, wherein said power storing means includes a plurality of capacitors, and a booster circuit adapted to be connected in parallel on charge and connected in series on discharge.

4. An apparatus according to claim 2, wherein said power storing means includes a plurality of capacitors, and a booster circuit adapted to be connected in parallel on charge and connected in series on discharge.

5. A power generation control apparatus for an internal combustion engine comprising:
   an ac generator including a plurality of armature windings and driven by said engine;
   power storage means for storing power supplied from said ac generator;
   a selector circuit for detecting an electromotive force difference generated by said plurality of armature windings to select one of said windings to be energized;
   a plurality of rectifiers for respectively rectifying outputs of said plurality of armature windings;
   a plurality of switch elements connected in parallel with said plurality of rectifiers to apply the power stored in said power storage means to said selected armature winding in response to a signal from said selector circuit;

rotational speed detecting means for detecting a rotational speed of said engine and outputting a rotational speed signal; and a control unit responsive to said rotational speed signal outputted from said rotational speed detecting means to control in such a manner that a generated output from said armature windings is supplied to said power storage means through said plurality of rectifiers to apply a rotational load to said engine when said rotational speed is greater than a predetermined value thereof and the power from said power storage means is selectively supplied to said armature windings through said plurality of switch elements to supply a torque to said engine when said rotational speed is smaller than said predetermined value.

6. An apparatus according to claim 5, wherein said control unit has a learning function of computing a rotational speed variation obtained as a difference between an actual rotational speed in terms of degrees of crankshaft rotation of said engine and an average rotational speed obtained by averaging said rotational speed during one rotation of said engine, and controlling in accordance with rotational speed variation information over at least one previous rotation of said engine to switch said ac generator to operate as a generator or a motor.

7. An apparatus according to claim 6, wherein said power storing means includes a plurality of capacitors, and a booster circuit adapted to be connected in parallel on charge and connected in series on discharge.

8. An apparatus according to claim 5, wherein said power storing means includes a plurality of capacitors, and a booster circuit adapted to be connected in parallel on charge and connected in series on discharge.

9. The apparatus according to claim 5, further comprising:

an idling detecting means for detecting an idling operation of said engine;

wherein said apparatus is operated only when said idling detecting means detects that said engine is idling.

* * * * *